United States Patent
Murayama (10) Patent No.: US 12,411,892 B2
(45) Date of Patent: Sep. 9, 2025

(54) INFORMATION PROCESSING APPARATUS, INFORMATION PROCESSING METHOD, AND RECORDING MEDIUM

(71) Applicant: CASIO COMPUTER CO., LTD., Tokyo (JP)

(72) Inventor: Yoichi Murayama, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 339 days.

(21) Appl. No.: 17/880,246

(22) Filed: Aug. 3, 2022

(65) Prior Publication Data

US 2023/0070033 A1   Mar. 9, 2023

(30) Foreign Application Priority Data

Sep. 8, 2021   (JP) .................. 2021-146184

(51) Int. Cl.
| | |
|---|---|
| *G06F 16/903* | (2019.01) |
| *G06F 40/242* | (2020.01) |
| *G06F 40/289* | (2020.01) |
| *G06F 40/40* | (2020.01) |
| *G06N 20/00* | (2019.01) |

(52) U.S. Cl.
CPC ...... *G06F 16/90335* (2019.01); *G06F 40/242* (2020.01); *G06F 40/289* (2020.01); *G06F 40/40* (2020.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2016/0085757 | A1* | 3/2016 | Rachi | G06F 16/3322 707/727 |
| 2018/0005112 | A1* | 1/2018 | Iso-Sipila | G06F 40/274 |
| 2020/0097818 | A1* | 3/2020 | Li | G06N 3/08 |

FOREIGN PATENT DOCUMENTS

| | | | | | |
|---|---|---|---|---|---|
| JP | 09212520 | A | * | 8/1997 | ......... G06F 17/2735 |
| JP | 2007219824 | A |   | 8/2007 | |
| JP | 6685194 | B2 |   | 4/2020 | |
| WO | WO-2006064566 | A1 | * | 6/2006 | ......... G06F 17/2735 |

OTHER PUBLICATIONS

Pasumarthi, "Language Model using Char RNN." Medium, Feb. 28, 2019, https://ppasumarthi-69210.medium.com/language-model-using-char-rnn-1df53f735880. Accessed Feb. 17, 2025. (Year: 2019).*

Tokuda, et al., "English Word Microlearning Support Method Based on Automatic Collection of Dictionary Search History", IPSJ SIG Technical Report, vol. 2019-MBL-90 No. 44, Mar. 5, 2019.

* cited by examiner

*Primary Examiner* — Hai Phan
*Assistant Examiner* — Jon Christopher Meis
(74) *Attorney, Agent, or Firm* — Holtz, Holtz & Volek PC (57) ABSTRACT

An information processing apparatus includes a memory and at least one processor. The memory stores a learned model having learned correlation between character strings included in a search history of words and/or phrases. The processor inputs information of a search history of words and/or phrases by a target user to the learned model. The processor creates a word and/or a phrase for learning by the target user.

17 Claims, 8 Drawing Sheets

| Input data | Teacher data |
|---|---|
| construct hectic overworking i | n |
| struct hectic overworking inte | r |
| uct hectic overworking interac | t |
| ... | ... |

INFORMATION PROCESSING APPARATUS, INFORMATION PROCESSING METHOD, AND RECORDING MEDIUM

CROSS-REFERENCE TO RELATED APPLICATION

This application is based upon and claims the benefit of priority from prior Japanese Patent Application No. 2021-146184, filed Sep. 8, 2021, the entire contents of which are incorporated herein by reference.

FIELD

The disclosure relates to an information processing apparatus, an information processing method, and a recording medium.

BACKGROUND

In prior art, electronic dictionaries include electronic dictionaries having a function of a vocabulary notebook storing words and/or phrases, such as words and/or idioms, searched by the users, and presenting them to the users. The electronic dictionaries having a function of a vocabulary notebook include electronic dictionaries having a test function of setting the user a problem of words or the like as a testing question (for example, Japanese Patent Application Publication No. 2007-219824).

SUMMARY

An information processing apparatus according to an aspect, includes a memory and at least one processor. The memory stores a learned model having learned correlation between character strings included in a search history of words and/or phrases. The processor inputs information of a search history of words and/or phrases by a target user to the learned model. The processor creates a word and/or a phrase for learning by the target user.

DETAILED DESCRIPTION

Figure 1:
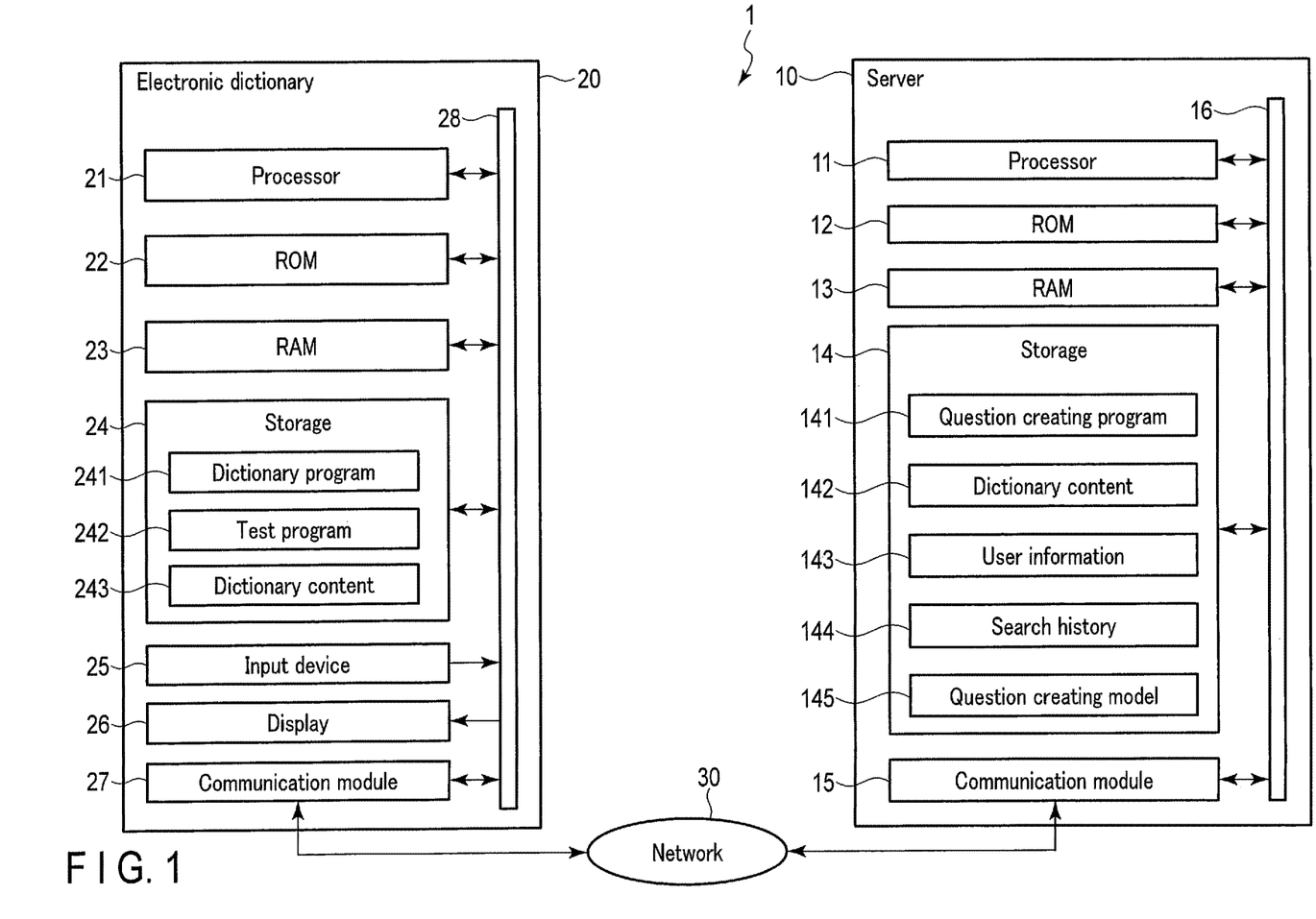
FIG. 1 is a diagram showing an example of configuration of a system according to an embodiment of the present disclosure.

An embodiment of the present disclosure will be explained hereinafter with reference to drawings. FIG. 1 is a diagram showing an example of configuration of a system 1 according to an embodiment of the present disclosure. A system 1 includes a server 10 and an electronic dictionary 20. The server 10 and the electronic dictionary 20 are connected to be communicatable via a network 30. The network 30 is, for example, the Internet. FIG. 1 illustrates only one electronic dictionary 20, but the number of electronic dictionaries 20 is not limited to one. Specifically, two or more electronic dictionaries 20 may be included.

The server 10 is an information processing apparatus including a processor 11, a ROM 12, a RAM 13, a storage 14, and a communication module 15. These units are mutually connected via a system bus 16.

The processor 11 is a processor controlling various operations of the server 10. The processor 11 may be an integrated circuit including a CPU (Central Processing Unit) and the like. As the processor 11, a processor other than a CPU may be used. Examples of the processor include an ASIC (Application Specific Integrated circuit), a FPGA (Field Programmable Gate Array), and a GPU (Graphic Processing Unit).

The ROM 12 records information used for operations of the processor 11 and the like. The RAM 13 is a main storage device for operations of the processor 11 and the like.

The storage 14 stores various programs, such as a server control program used in the processor 11 and an arithmetic program to execute various arithmetic operations, and parameters and the like. The programs includes a question creating program 141. The question creating program 141 serving as an information processing program is a program creating a question in accordance with a user's search history for words and/or phrases in the electronic dictionary 20. The processor 11 can operate as a question creating unit by executing processing in accordance with the question creating program 141 stored in the storage 14. The question creating unit may be achieved with a dedicated circuit achieving similar operations. For example, the user in the embodiment is supposed to be a student. As a matter of course, the user may be a person other than a student.

The storage 14 also stores a dictionary content 142. The dictionary content 142 is content data, such as an English-Japanese dictionary and a Japanese-English dictionary, storing words and/or phrases, in association with pronunciation and meaning thereof. The dictionary content 142 is not limited to English dictionaries. The dictionary content 142 may be content data of dictionaries of a language other than English.

The storage 14 also stores user information 143 and a search history 144. The user information 143 is information to identify the user of the electronic dictionary 20. The user information may include, for example, a user's ID, an ID of the electronic dictionary 20, and information indicating the attribute of the user, such as the user's age, and the school's name and the class name to which the user belongs. The search history 144 is information of a history of words and the like for which the user has searched using the electronic dictionary 20. The search history 144 is collected, for example, whenever the electronic dictionary 20 is powered off.

The storage 14 also stores a question creating model 145. The question creating model 145 is a learned machine learning model configured to receive a character string acquired from the user's search history 144 and create a new character string relating to the input character string. The character string input or created in the embodiment is formed of one or more characters and may include a word or a phrase. The question creating model 145 in the embodiment is formed of, for example, a recurrent neural network (RNN).

Figure 2A:
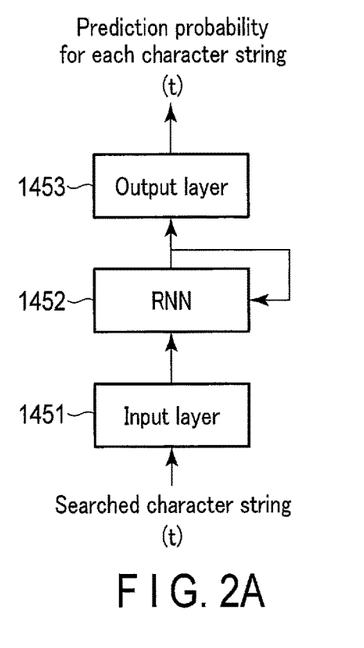
FIG. 2A is a conceptual diagram of a question creating model using an RNN.

FIG. 2A is a conceptual diagram of the question creating model 145 using a RNN. FIG. 2A illustrates a state of the question creating model 145 at time t. As illustrated in FIG. 2A, the question creating model 145 includes an input layer 1451, an intermediate layer 1452, and an output layer 1453.

The input layer 1451 converts the character string input as the search history 144 into a vector quantity, and outputs a character string vector acquired by conversion to the intermediate layer 1452. The input character string is divided into, for example, words, and a space is included between the adjacent words.

Figure 2B:
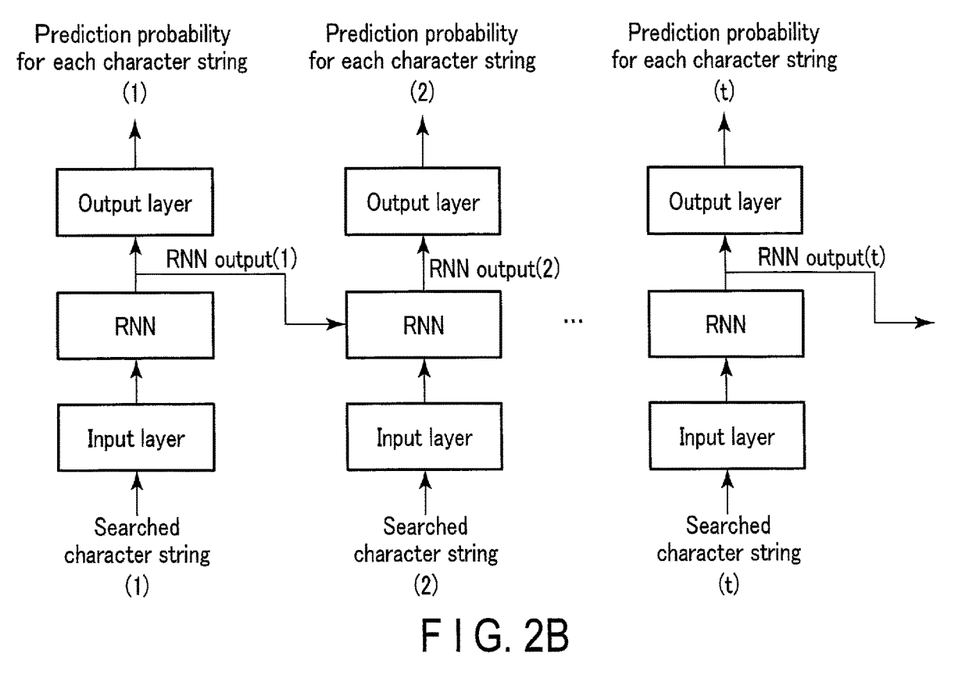
FIG. 2B is a diagram illustrating a question creating model acquired by developing the RNN block illustrated in FIG. 2A.

The intermediate layer 1452 is an RNN block. The RNN block receives a character string vector from the input layer 1451, and receives an output of the RNN block at the previous time. The RNN block inputs the input from the input layer 1451 and the output of the RNN block at the previous time to a preset function f, and outputs output of the function f as a RNN output of the current time. FIG. 2B is a diagram illustrating a question creating model 145 acquired by developing the RNN block illustrated in FIG. 2A. As illustrated in FIG. 2B, the RNN block at the time t outputs a RNN output (t) on the basis of the input from the input layer at the time t and the RNN output (t−1) at time t−1. As illustrated in FIG. 2B, the RNN output at each time reflects the state of the RNN output before the time. For this reason, the RNN output (t) at the time t reflects the state of the RNN outputs from the time 1 to the time t. In this manner, the intermediate layer 1452 outputs a RNN output reflecting time-series input change.

The output layer 1453 converts the RNN output from the intermediate layer into a value of distribution of appearance probability of the character string using a Softmax function or the like. For example, if the question creating model 145 is configured to output one alphanumeric character for each input of the search history 144 for English words, the output layer 1453 outputs a probability of appearance of each character string supposed to appear, such as an alphabet, a numerical character, a space, and a symbol such as "&".

The question creating model 145 may be provided for each of users, for each age of users, for each school year or class, or may be provided without these discriminations.

The communication module 15 includes a circuit to communicate with an external communication network, such as the network 30.

The electronic dictionary 20 includes a processor 21, a ROM 22, a RAM 23, a storage 24, an input device 25, a display 26, and a communication module 27. These units are mutually connected via a system bus 28. The electronic dictionary 20 may be an electronic apparatus, such as a personal computer (PC), a tablet terminal, and a smartphone in which an electronic dictionary application is installed.

The processor 21 is a processor controlling various operations of the electronic dictionary 20. The processor 21 may be an integrated circuit including a CPU and the like. As the processor 21, a processor other than a CPU may be used.

The ROM 22 records a starting program for the electronic dictionary 20 and the like. The RAM 23 is a main storage device for the processor 21.

The storage 24 stores various programs, such as electronic dictionary control program used in the processor 21, and parameters. The processor 21 controls operations of the electronic dictionary 20 by executing various programs in accordance with an input signal from the input device 25 or the like. The various programs include, for example, a dictionary program 241 and a test program 242. The dictionary program 241 is a program to execute a series of processes of searching the dictionary content 243 on the basis of a user's input and presenting the search result to the user. The test program 242 is a program to execute a series of processes relating to a test to inquire of the user the meaning and the pronunciation and the like of a word.

The storage 24 also stores the dictionary content 243. The dictionary content 243 is content data, such as an English-Japanese dictionary and a Japanese-English dictionary, storing words and/or phrases, in association with pronunciation and meaning thereof. The dictionary content 243 is not limited to English dictionaries. The dictionary content 243 may be content data of dictionaries of a language other than English. The dictionary content 243 may be the same as the dictionary content 142 of the server 10, or may include part of data of the dictionary content 142.

The input device 25 includes input keys and a touch panel and the like. The input device 25 may also include a voice input device, such as a microphone. In accordance with a user's operation via the input device 25, a signal indicating details of the user's operation is input to the processor 21 via the system bus 28.

The display 26 is a liquid crystal display or an organic EL display or the like. The display 26 may be provided as one unitary piece with the electronic dictionary 20, or separately from the electronic dictionary 20. Various images are displayed on the display 26.

The communication module 27 includes a circuit to communicate with an external communication network, such as the network 30.

Figure 3:
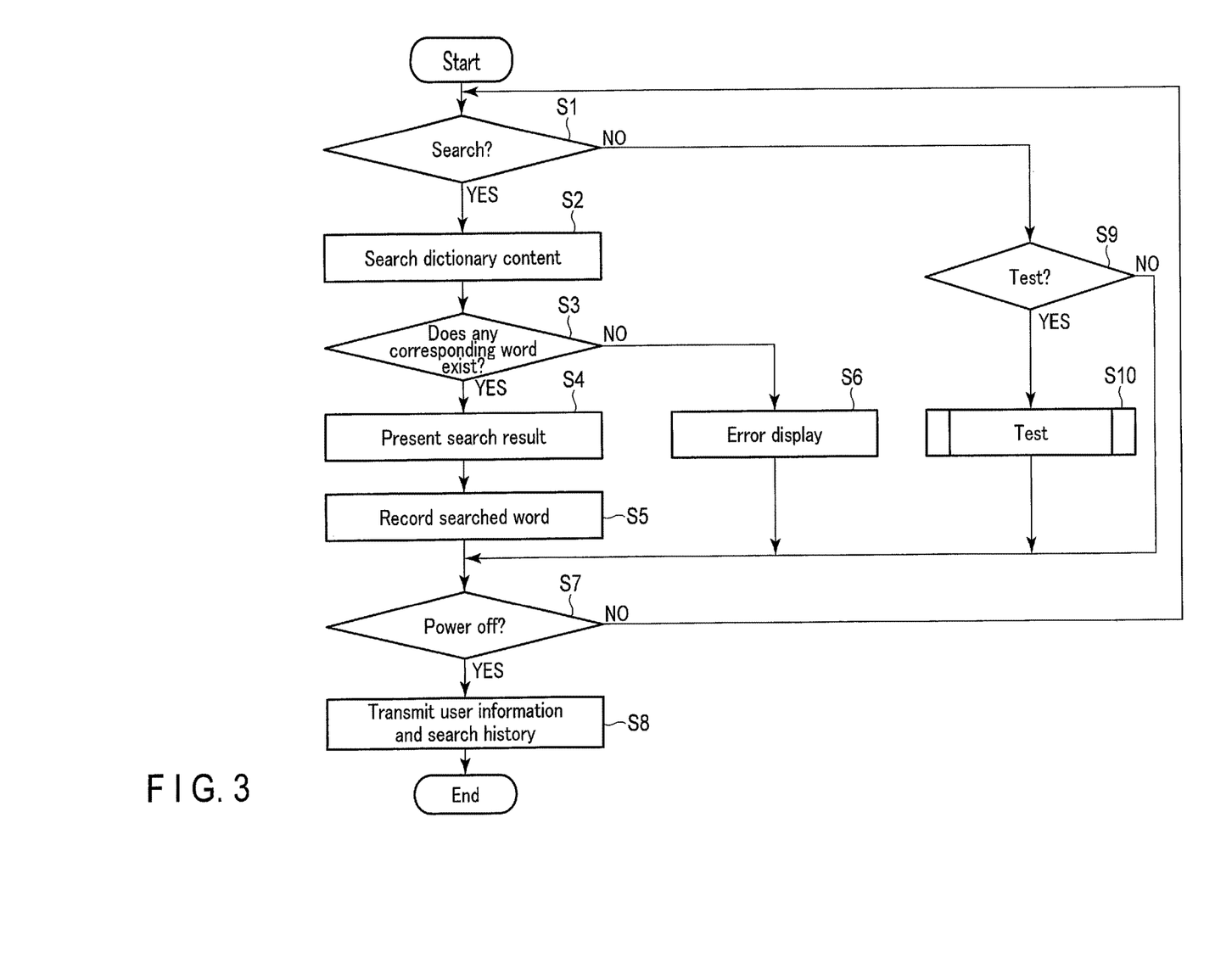
FIG. 3 is a flowchart showing operations of an electronic dictionary.

The following is an explanation of operations of the system 1. FIG. 3 is a flowchart showing operations of the electronic dictionary 20. The process in FIG. 3 is started if, for example, the electronic dictionary 20 is powered on.

At Step S1, the processor 21 of the electronic dictionary 20 determines whether to execute search. For example, if the user inputs a character string, such as a word, to a search box displayed on the display 26 after the electronic dictionary 20 starts to operate, the electronic dictionary 20 determines to execute search. If it is determined at Step S1 to execute search, the processing proceeds to Step S2. If it is determined at Step S1 to execute no search, the processing proceeds to Step S9.

At Step S2, the processor 21 refers to the dictionary content 243 on the basis of the input character string, and searches for a word or the like partially matching the input character string.

At Step S3, the processor 21 determines whether any corresponding word or the like exists as a result of search. If it is determined at Step S3 that any corresponding word or the like exists, the processing proceeds to Step S4. If it is determined at Step S3 that no corresponding word or the like exists, the processing proceeds to Step S6.

At Step S4, the processor 21 displays information of the dictionary content 243 relating to the corresponding word as a search result. For example, the processor 21 displays information, such as the meaning and the pronunciation of the word on the display 26. For example, if a plurality of corresponding words or the like exist, the processor 21 may display a list of the corresponding words or the like on the display 26, receive subsequent user's selection of the word or the like, and display information, such as the meaning and the pronunciation of the selected word, on the display 26.

At Step S5, the processor 21 records information of the character string input in the search on the storage 24 or the like as a search history. Thereafter, the processing proceeds to Step S7.

At Step S6, the processor 21 executes error display on the display 26. The error display includes, for example, display of a message to notify the user that no corresponding words exist. After the error display, the processing proceeds to Step S7.

At Step S7, the processor 21 determines whether to power off the electronic dictionary 20. For example, if a predetermined period of time for which no operations are executed passes or the power switch is turned off, it is determined to power off the electronic dictionary 20.

If it is determined at Step S7 to power off the electronic dictionary 20, the processing proceeds to Step S8. If it is determined at Step S7 not to power off the electronic dictionary 20, the processing returns to Step S1.

At Step S8, the processor 21 transmits information of the search history recorded on the storage 24 to the server 10 together with the user information using the communication module 27. Thereafter, the processor 21 powers off the electronic dictionary 20 to finish the processing in FIG. 3. Transmission of information of the search history is not limited to execution directly before power off. Transmission of information of the search history may be executed in a specific time period, such as the night of each day.

At Step S9, the processor 21 determines whether to execute a test. For example, if the operating mode of the electronic dictionary 20 is set to the test mode by the user, it is determined to execute a test. As another example, it may be automatically determined to execute a test, if the electronic dictionary 20 is powered on. If it is determined at Step S9 to execute a test, the processing proceeds to Step S10. If it is determined at Step S9 to execute no test, the processing proceeds to Step S7.

At Step S10, the processor 21 executes test processing. After execution of the test processing, the processing proceeds to Step S7. The test processing will be explained later.

Figure 4:
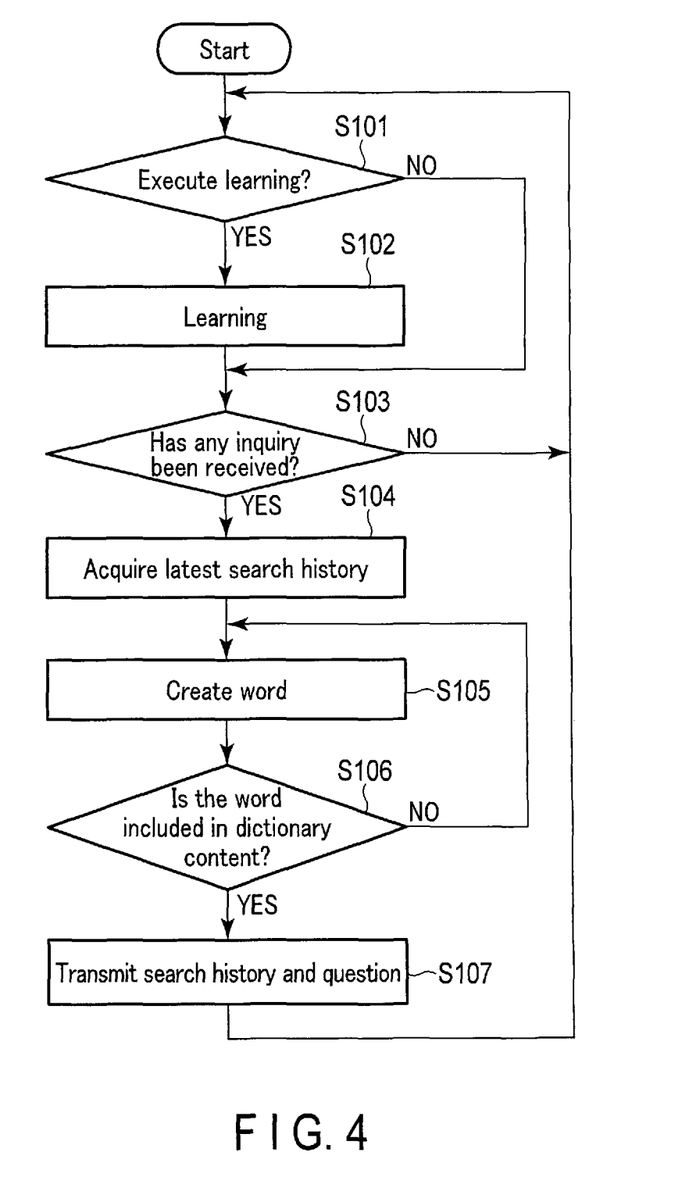
FIG. 4 is a flowchart showing operations of a server.

FIG. 4 is a flowchart showing operations of the server 10. The processing in FIG. 4 is intermittently executed during the operation of the server 10.

At Step S101, the processor 11 of the server 10 determines whether to execute learning of the question creating model 145. For example, it is determined to execute learning for each predetermined period of time, such as the night of each day. If it is determined at Step S101 to execute learning, the processing proceeds to Step S102. If it is determined at Step S101 to execute no learning, the processing proceeds to Step S103.

At Step S102, the processor 11 executes learning of the question creating model 145. After execution of the learning, the processing proceeds to Step S103.

The following is an explanation of learning of the question creating model 145 in the embodiment with a specific example. The following example illustrates learning of the question creating model 145 for English words.

Figure 5:
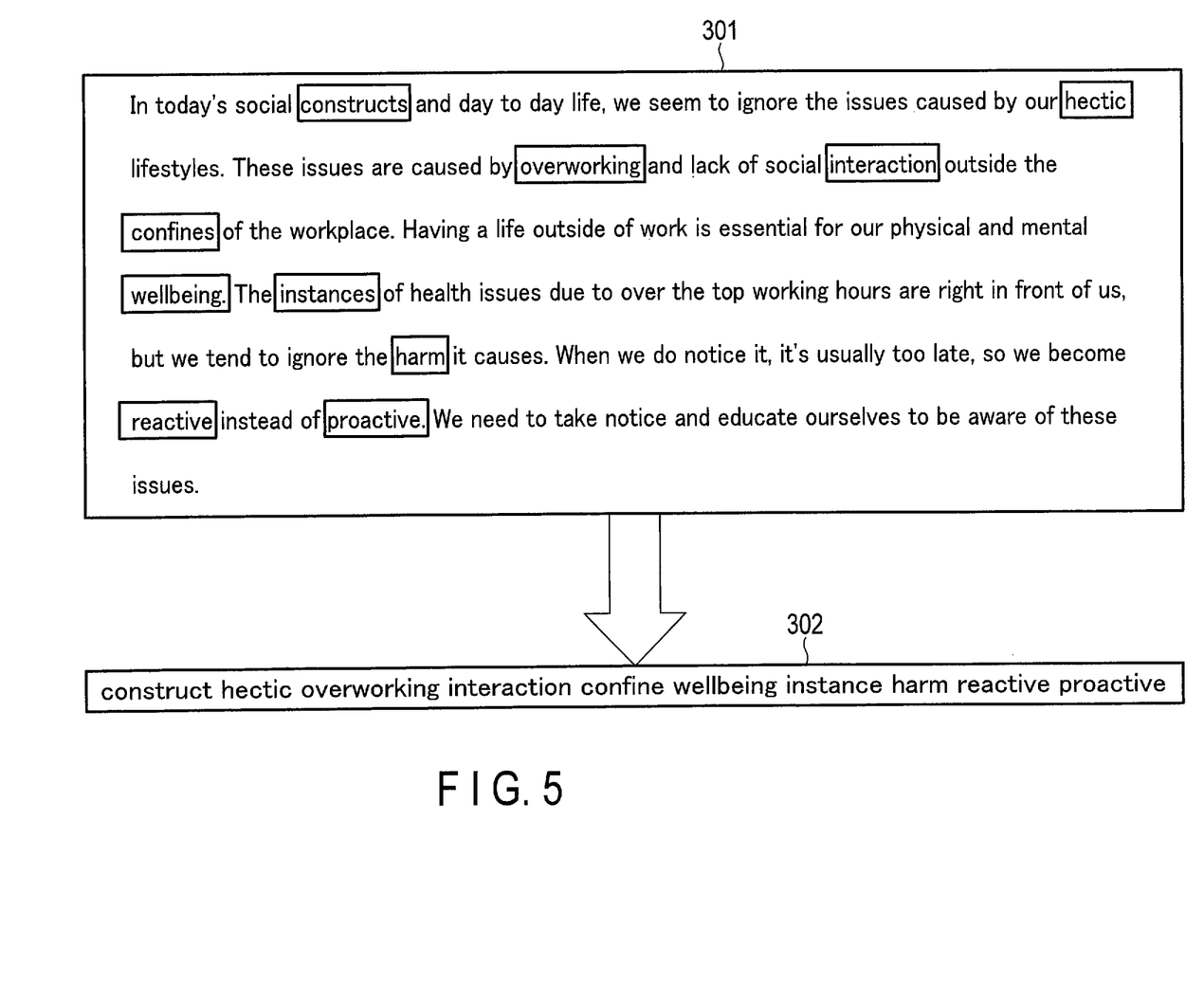
FIG. 5 is a diagram showing an example of sentences which the user has searched for words using the electronic dictionary.

For example, suppose that the user of the electronic dictionary 20 searches for the meanings of the words indicated with frames in sentences 301 of FIG. 5 using the electronic dictionary 20. Thereafter, if the electronic dictionary 20 is powered off, information of a search history 302 is transmitted to the server 10 together with the user information. The search history 302 is formed of a word string "construct hectic overworking interaction confine wellbeing instance harm reactive proactive" in which the searched English words are arranged in a line. The search history 302 also includes each of spaces between adjacent words as a character. The word string transmitted as the search history 302 in FIG. 5 is a search history of words in the same sentences. In this case, the searched words are considered to have correlation of a certain degree. For example, in the search history 302 in FIG. 5, the words "active" and "proactive" have relation of antonyms. The question creating model 145 generates a character string of words or the like by learning the correlation between the searched words as described above.

Figure 6:
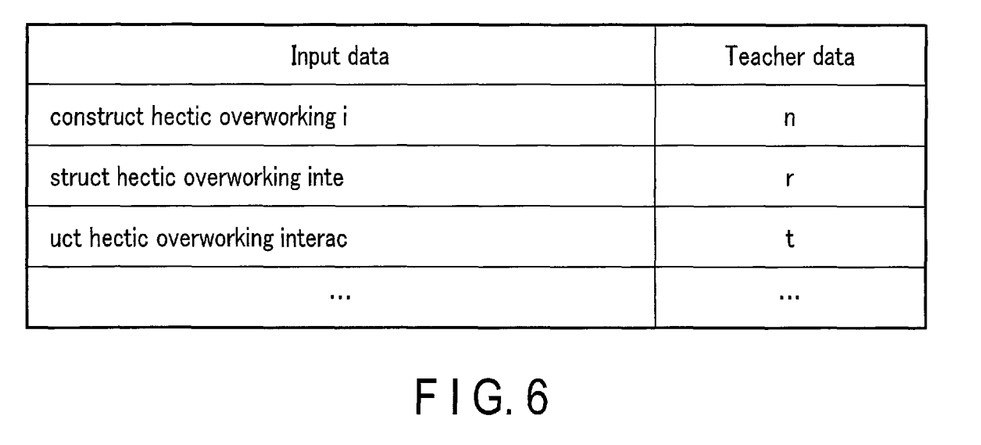
FIG. 6 is a diagram showing relation between data input to the question creating model and teacher data.

FIG. 6 is a diagram showing relation between data input to the question creating model 145 and teacher data. In this example, a character string formed of 30 characters including spaces is input to the question creating model 145. The question creating model 145 predicts the next character of the input character string.

In this case, first, the processor 11 inputs the top 30 characters, that is, "construct hectic overworking i" of the word string "construct hectic overworking interaction confine wellbeing instance harm reactive proactive" received as the search history 302 to the question creating model 145. By contrast, the processor 11 inputs the next character "n" of the input 30 characters as the teacher data.

Thereafter, the processor 11 inputs the 30 characters "struct hectic overworking inte" acquired by shifting the range from the previous input characters "construct hectic overworking i" by a predetermined number of characters, for example, three characters, to the question creating model 145. By contrast, the processor 11 inputs the next character "r" of the input 30 characters as the teacher data.

Thereafter, the processor 11 inputs all the characters received as the search history 302, in the same manner. Lastly, the processor 11 inputs a space as the teacher data.

Whenever a character string is input, the question creating model 145 executes prediction using the input character string and the previous RNN output. For example, the question creating model 145 predicts the prediction probability indicating the appearance probability for each supposed character string, for example, 0.2 as the probability of "a", 0.1 as the probability of "b", 0.02 as the probability of "z", and 0.05 as the probability of a space. The question creating model 145 regulates a weight coefficient or the like used for a function f in the RNN block to decrease a difference between the prediction result and the teacher data. Learning is executed by repeating such processing.

As described above, the question creating model 145 inputs a partial character string of the character string based on the search history, and regulates the weight coefficient or the like to output a partial character string of a different part in the character string of the search history. Specifically, the question creating model 145 learns correlation between character strings included in the search history.

In the example of FIG. 6, each of the character strings is input to the question creating model 145 while the range thereof is shifted by three characters. By contrast, the number of shifted characters is not limited to three. For example, each of the character strings may be input to the question creating model 145 while the range thereof is shifted by one character or two characters, or by four or more characters. Learning of the question creating model 145 can be executed with higher accuracy as the number of shifted characters decreases. By contrast, with decrease in the number of shifted characters, learning requires much time. Generally, most English words are formed of three or more characters. For this reason, with the number of shifted characters of three, the structure easily extracts characteristics of the same degree as those in the case where the number of shifted character is one, and achieves the learning accuracy not largely different from that in the case where the number of shifted character is one. Accordingly, in the present embodiment, the number of shifted characters is set to three.

In addition, as described above, the question creating model 145 may be provided for each of users, for each age of users, or for each school year or class of the school the users attend. In these cases, the processor 11 selects information to be input to the question creating model 145 on the basis of the user information. For example, if the question creating model 145 is provided for each of users, the processor 11 executes learning of the question creating model 145 only with information of the search history of the same user on the basis of the user information. In the same manner, if the question creating model 145 is provided for each age of users, the processor 11 executes learning of the question creating model 145 only with information of the search histories of users of the same age on the basis of the user information.

FIG. 4 will be explained again hereinafter. At Step S103, the processor 11 determines whether any inquiry for a test question has been received from the electronic dictionary 20. As explained later, in the test processing in the electronic dictionary 20, the electronic dictionary 20 issues an inquiry for a test question to the server 10. At Step S103, it is determined whether any inquiry has been received. If it is determined at Step S103 that an inquiry has been received, the processing proceeds to Step S104. If it is determined at Step S103 that no inquiry has been received, the processing returns to Step S101.

At Step S104, the processor 11 acquires, from the storage 14, the latest search history of the user of the electronic dictionary 20 from which the inquiry has been received, for example, the search history collected last night.

At Step S105, the processor 11 inputs the acquired search history to the question creating model 145 to create a word for a test question.

Figure 7:
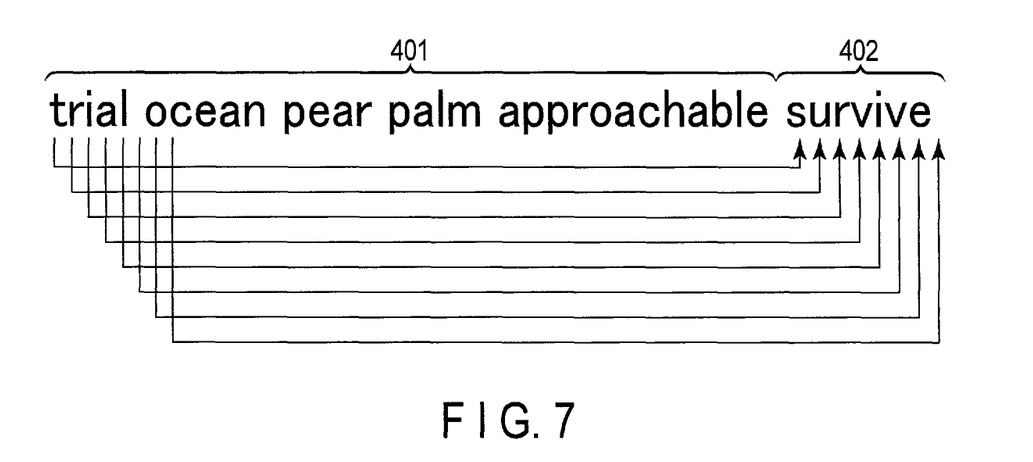
FIG. 7 is a diagram showing relation between a word string of a search history input to the question creating model and a created word.

The following is an explanation of creation of a word using the question creating model 145 in the embodiment with a specific example. FIG. 7 is a diagram showing relation between a word string of the search history input to the question creating model 145 and a created word.

For example, suppose that the latest search history is formed of five words "trial", "ocean", "pear", "palm", and "approachable". In this case, the processor 11 creates a word string 401 by arranging the five words in a line with a space therebetween. The processor 11 inputs the word string 401 to the question creating model 145. In response to it, the question creating model 145 predicts the next character subsequent to the character string "trial ocean pear palm approachable" including spaces.

First, the processor 11 inputs the 35 characters "trial ocean pear palm approachable" including spaces to the question creating model 145. The question creating model 145 predicts the prediction probability of each of character strings, such as an alphabet, a numerical character, a space, and a symbol "&" and the like that can appear subsequently to the input "trial ocean pear palm approachable".

Thereafter, the processor 11 inputs the character string "rial ocean pear palm approachable s" including the character "s" starting from the second character of the word string 401 and having the highest prediction probability in the first prediction to the question creating model 145. The question creating model 145 predicts the prediction probability of each of character strings, such as an alphabet, a numerical character, a space, and a symbol "&" and the like that can appear subsequently to the input "rial ocean pear palm approachable s".

The processor 11 repeats input of the character string in the same manner thereafter, and finishes prediction temporarily if the prediction probability of a space becomes highest. In this operation, the processor 11 extracts previous characters having high prediction probabilities if the prediction is finished successively from the head, and creates a character string acquired by arranging the extracted characters as a word. For example, in the example in FIG. 7, a space appears as a predicted character at the eighth input "cean pear palm approachable survive". The character string "survive" being the character string 402 before the space is a word created with the question creating model 145.

A plurality of words can be created by repeating the same processing even after the space appears. In this manner, not only words but also phrases may be created. In experiments executed by the inventors, the following word string was acquired as an example: "cognize, stand seem sure experientially strange according contriver tempt allotrope somehow simultaneon desirably seem considerabt absent considerabh support make belong master specific export bound seat product should recognize, present strong reabuer care sure come tend distally complementizer seem make profession". Although the string includes some words that do not exist as English words, they are sorted in the following step.

FIG. 4 will be explained again hereinafter. At Step S106, the processor 11 determines whether the created word is a word included in the dictionary content 142. Specifically, words that do not exist as English words or words that are not included in the dictionary content 142 are not adopted as test questions. If it is determined at Step S106 that the created word is not included in the dictionary content 142, the processing returns to Step S105. As described above, because different words are created by repeating processing even after a space appears, creation of a word is repeatedly executed until a word included in the dictionary content 142 is created. If word creation is executed again, the processor 11 may extract characters from the head such that a word included in the dictionary content 142 is created, on the basis of the previous prediction result. Specifically, the structure may adopt a method of recording the appearance probability of each of characters in the previous prediction, and combining characters having relatively high probabilities, such as the second place and the third place, to create a word included in the dictionary content 142. If it is determined at Step S106 that the created word is included in the dictionary content 142, the processing proceeds to Step S107. At Step S106, it may also be determined whether the created word is a word for which the user searched in the past predetermined time period, in addition to determination as to whether the created word is included in the dictionary content 142. The processing may proceed to Step S107, if the created word is included in the dictionary content 142 but not a word for which the user searched in the past predetermined time period.

At Step S107, the processor 11 transmits the search history used for creation of a test question and a test question including the created word to the electronic dictionary 20 that has issued the inquiry. Thereafter, the processing returns to Step S101. The test question is, for example, a question inquiring the meaning and/or the pronunciation of a word or a phrase, and includes a question and an answer to it. Whether the question is a question inquiring the meaning or a question inquiring the pronunciation of the word may be determined at random or designated in advance by the user of the electronic dictionary 20 or the like.

Figure 8:
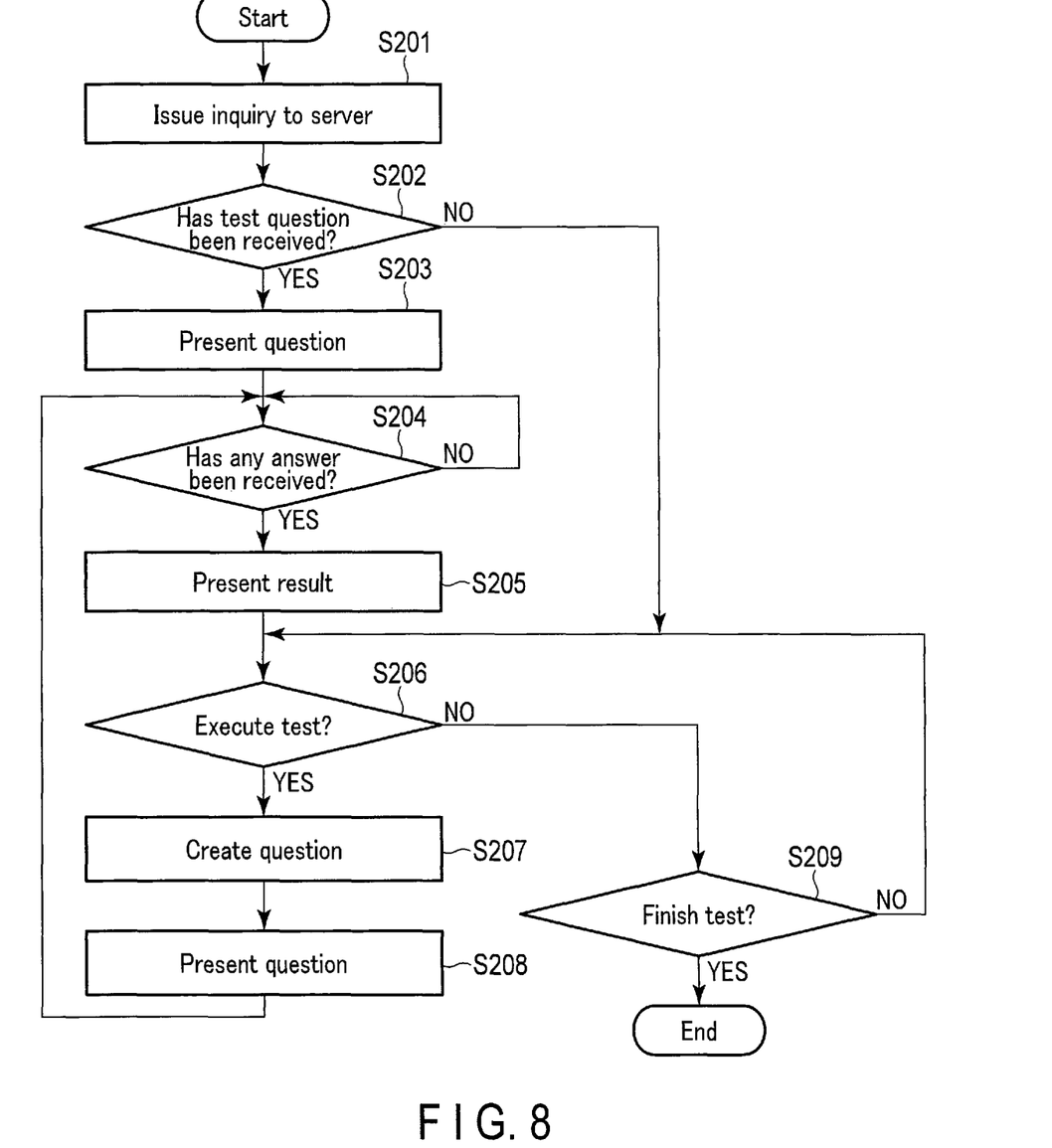
FIG. 8 is a flowchart showing test processing in the electronic dictionary.

FIG. 8 is a flowchart showing test processing in the electronic dictionary 20. At Step S201, the processor 21 issues an inquiry for a test question to the server 10.

At Step S202, the processor 21 determines whether a test question has been received from the server 10. If it is determined at Step S202 that a test question has been received, the processing proceeds to Step S203. If it is determined at Step S202 that no test question has been received, the processing proceeds to Step S206.

Figure 9:
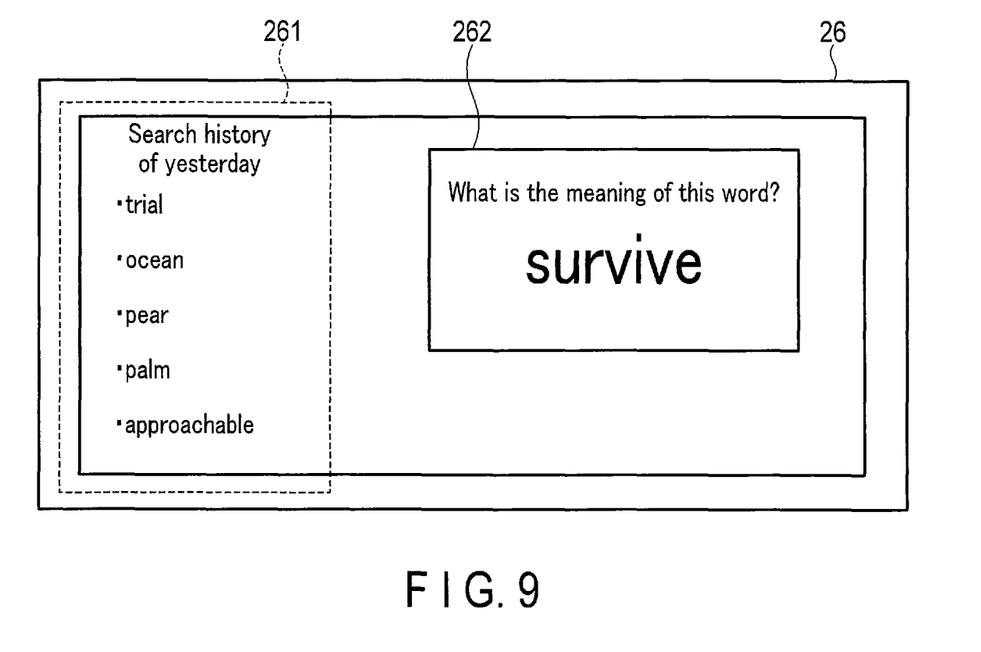
FIG. 9 is a diagram showing an example of presenting a test question.

At Step S203, the processor 21 presents a test question to the user. FIG. 9 is a diagram showing an example of presenting a test question. The example of FIG. 9 displays a list 261 of words of the search history of the previous day used for creation of the test question. In addition, in the example of FIG. 9, a question 262 is presented as the test question. The question 262 inquires the meaning of the created word "survive". In response to presentation of such a question, the user inputs an answer using the input device 25.

At Step S204, the processor 21 determines whether any answer from the user has been received. At Step S204, the processor 21 stands by for processing until it is determined that an answer from the user is received. If it is determined at Step S204 that an answer from the user has been received, the processing proceeds to Step S205.

At Step S205, the processor 21 compares the answer from the user with the correct answer of the question, and presents a result indicating whether the user's answer to the question is correct or wrong to the user. Thereafter, the processing proceeds to Step S206.

At Step S206, the processor 21 determines whether the user has commanded to execute a test. If it is determined at Step S206 that the user has commanded to execute a test, the processing proceeds to Step S207. If it is determined at Step S206 that the user has not commanded to execute a test, the processing proceeds to Step S209.

At Step S207, the processor 21 creates a test question. For example, the processor 21 selects a word from the dictionary content 142, and creates a question to inquire the meaning and/or the pronunciation of the selected word. Whether the question is a question inquiring the meaning or a question inquiring the pronunciation of the word may be determined at random or designated in advance by the user of the electronic dictionary 20 or the like. If the word is selected, the processor 21 may select the word for which the user searched in the past or the word for which the user did not search in the past from the words included in the dictionary content 142.

At Step S208, the processor 21 presents the test question to the user. Thereafter, the processing returns to Step S204. Presentation of the test question at Step S208 may basically be executed according to FIG. 9. However, display of the list 261 of words of the search history of the previous day may be omitted.

At Step S209, the processor 21 determines whether to finish the test. For example, if the user sets the operating mode of the electronic dictionary 20 to a mode other than the test mode, it is determined to finish the test. If it is determined at Step S209 to finish the test, the processor 21 finishes the processing in FIG. 8. If it is determined at Step S209 not to finish the test, the processing returns to Step S206.

As described above, according to the embodiment, a test question (words and/or phrases for user's study) on the basis of the learning result of the search history of the electronic dictionary 20 (electronic apparatus having a search function) of the user. Because search is executed in time series, the searched words are considered to have correlation of a certain degree. Because the test question is created on the basis of such correlation, a word or a phrase that may be related to the words or the phrases searched for by the user is easily presented as the test question. This structure is expected to effectively improve the user's vocabulary. In addition, a test question is created also on the basis of search histories of a plurality of users. This structure enhances the possibility that a new word or a phrase that may be related to the words or the phrases searched for by the user is presented as the test question. This structure is further expected to effectively improve the user's vocabulary.

Specifically, information of the target user's search history of words and/or phrases is input to the learned model having learned correlation between character strings included in the search history of words and/or phrases to create a word and/or a phrase for learning by the target user. This structure enables the target user to learn vocabulary more effectively.

In addition, the learned model can learn correlation between character strings included in the search histories of the electronic dictionary by a plurality of users included users other than the target user. This structure enables more effective determination of a word and/or a phrase for learning by the target user, also with reference to search histories of users other than the target user.

In addition, the learned model has learned time series of a plurality of character strings included in the search history. With this structure, by inputting the search histories by the target user to the learned model in a time-series manner, a word or a phrase that is not included in the input search histories may be output in a time-series manner. This structure enables the user to learn a new word or a phrase that is correlated in a time-series manner but has not been searched by the target user.

In addition, in the embodiment, learning of the question creating model can be executed for each of users, for each age of users, or each attribute of users, in consideration of the user information. This structure enables creation of a test question close to the current learning capacity of the user.

Specifically, the learned model has learned search histories by users having the attribute for each attribute of users, and is configured to create a word or a phrase for learning by the target user on the basis of learning results of search histories of other users having the same attribute as the attribute of the target user. This structure enables more effective learning of words and/or phrases on the basis of search histories of other users having attribute similar to the attribute of the target user.

Modification

A modification of the embodiment will be explained hereinafter. In the embodiment, a RNN is used as the question creating model 145. This is because the search history includes information of arrangement of words in time series, and learning with a RNN is suitable. By contrast, RNNs have various derived models, such as a long short-term memory (LSTM). In the embodiment, various derived models of an RNN may be used. For example, a LSTM enables proper learning even if the character string included in the search history is very long. As another example, a convolutional neural network (CNN) or the like may be used instead of a RNN. Specifically, the question creating model 145 may be any machine learning model configured to create a new word or a phrase, with the search history of the user's dictionary used as an input.

In addition, in the embodiment, the electronic dictionary 20 is capable of communicating. However, some types of electronic dictionaries are not capable of communicating. In this case, for example, the electronic dictionary 20 may transmit the search history via a terminal, such as a smartphone. For example, the electronic dictionary 20 may have a structure in which a two-dimensional code including the search history and the user information is displayed on the display 26 if the electronic dictionary 20 is powered off, the two-dimensional code displayed on the display 26 is read by the user using a smartphone or the like, and the information read using the smartphone is transmitted to the server 10. In this case, the test question created in the server 10 may be displayed on the smartphone or the like. With this structure, the technique of the embodiment may also be applicable to electronic dictionaries having no communication function.

The embodiment illustrates creation of a test question of English as an example. The technique of the embodiment may also be applicable to creation of test questions of languages other than English.

The present invention is not limited to the embodiment described above, but various modifications are possible at the implementation stage within a range not departing from the gist of the invention. Embodiments may be carried out in proper combinations as long as possible, and effects of the combinations are acquired in these cases. The embodiment described above includes inventions of various stages, and various inventions may be extracted by appropriate combinations of a plurality of disclosed constituent elements. For example, even if some constituent elements are removed from all the constituent elements disclosed in the embodiment, the structure acquired by removing the constituent elements can be extracted as the invention, as long as the problem stated in the section of the problem to be solved by the invention can be solved and the effects stated in the section of the effects of the invention are acquired.

What is claimed is:

1. An information processing apparatus comprising:
   a memory storing a learned model having learned correlation between character strings included in a search history of words and/or phrases; and
   at least one processor inputting information of a search history of words and/or phrases by a target user to the learned model and creating a word and/or a phrase for learning by the target user,
   wherein:
   the learned model learns a time series of a plurality of character strings included in the search history;
   the at least one processor inputs search histories by the target user to the learned model in a time-series manner to output a word and/or a phrase that is not included in the input search histories in a time-series manner;
   the learned model is a recurrent neural network (RNN) learning correlation between character strings of the time series included in the search history;
   the learned model includes an input layer, an intermediate layer, and an output layer;
   the input layer converts a character string input as the search history into a vector quantity, and outputs a character string vector acquired by conversion to the intermediate layer;
   the intermediate layer is an RNN block which: receives the character string vector from the input layer and receives a previous output of the RNN block of a previous time, inputs the character string vector from the input layer and the previous output of the RNN block to a preset function f, and outputs output of the function f as a current RNN output of a current time, whereby the intermediate layer outputs an RNN output reflecting time-series input change;
   the output layer converts the RNN output from the intermediate layer into a value of distribution of appearance probability of a character based on the input character string;
   the processor creates the word and/or phrase by combining characters based on the value of distribution of appearance probability of each character, determines whether the created word and/or phrase is included in dictionary content stored in the memory, and controls an output device to output the created word and/or phrase determined to be included in the dictionary content stored in the memory, wherein the processor executes creation of a word and/or phrase again if it is determined that the created word and/or phrase is not included in the dictionary content stored in the memory; and
   in executing learning, the at least one processor (a) inputs to the learned model a partial character string of the character string based on the search history, the partial character string including a predetermined amount of characters, and (b) inputs a next character in the character string as teacher data, and (c) the model predicts the appearance probability for each supposed character string, and (d) regulates a parameter for the function f in the RNN block to decrease a difference between the prediction result and the teacher data, wherein learning is performed by repeatedly executing (a)-(d), wherein, for each subsequent execution of (a)-(d), the at least one processor inputs, as the partial character string, a partial character string obtained by shifting a range of the character string by a predetermined number of characters to obtain a new partial character string overlapping in part with the previous partial character string.

2. The information processing apparatus according to claim 1, wherein the learned model has learned correlation between character strings included in search histories of an electronic apparatus by a plurality of users including users other than the target user.

3. The information processing apparatus according to claim 2, further comprising:
   a communication module comprising a circuit and transmitting the created word and/or the phrase to the electronic apparatus used by the target user.

4. The information processing apparatus according to claim 1, wherein the learned model has learned search histories by users having an attribute for each of attributes of users, and creates a word and/or a phrase for learning by the target user on a basis of learning results of search histories of other users having the attribute equal to the attribute of the target user.

5. The information processing apparatus according to claim 1, wherein the at least one processor inputs the character string included in the search history as a character string including a space between words.

6. The information processing apparatus according to claim 1, wherein the at least one processor causes the learned model to execute learning on a basis of user information indicating an attribute of the user.

7. An information processing method comprising:
   inputting, by a computer of an information processing apparatus storing a learned model having learned correlation between character strings included in a search history of words and/or phrases, information of a search history of words and/or phrases by a target user to the learned model and creating a word and/or a phrase for learning by the target user, wherein:

the learned model learns a time series of a plurality of character strings included in the search history;

the method further comprises inputting, by the computer, search histories by the target user to the learned model in a time-series manner to output a word and/or a phrase that is not included in the input search histories in a time-series manner;

the learned model is a recurrent neural network (RNN) learning correlation between character strings of the time series included in the search history;

the learned model includes an input layer, an intermediate layer, and an output layer;

the input layer converts a character string input as the search history into a vector quantity, and outputs a character string vector acquired by conversion to the intermediate layer;

the intermediate layer is an RNN block which: receives the character string vector from the input layer and receives a previous output of the RNN block of a previous time, inputs the character string vector from the input layer and the previous output of the RNN block to a preset function f, and outputs output of the function f as a current RNN output of a current time, whereby the intermediate layer outputs an RNN output reflecting time-series input change;

the output layer converts the RNN output from the intermediate layer into a value of distribution of appearance probability of a character based on the input character string;

the method further comprises creating, by the computer, the word and/or phrase by combining characters based on the value of distribution of appearance probability of each character, determining whether the created word and/or phrase is included in dictionary content stored in the memory, and controlling an output device to output the created word and/or phrase determined to be included in the dictionary content stored in the memory, and creating a word and/or phrase again if it is determined that the created word and/or phrase is not included in the dictionary content stored in the memory; and the method further comprises executing learning, wherein, in said executing learning, the computer (a) inputs to the learned model a partial character string of the character string based on the search history, the partial character string including a predetermined amount of characters, and (b) inputs a next character in the character string as teacher data, and (c) the model predicts the appearance probability for each supposed character string, and (d) regulates a parameter for the function f in the RNN block to decrease a difference between the prediction result and the teacher data, wherein learning is performed by repeatedly executing (a)-(d), wherein, for each subsequent execution of (a)-(d), the computer inputs, as the partial character string, a partial character string obtained by shifting a range of the character string by a predetermined number of characters to obtain a new partial character string overlapping in part with the previous partial character string.

8. The information processing method according to claim 7, wherein the learned model has learned correlation between character strings included in search histories of an electronic apparatus by a plurality of users including users other than the target user.

9. The information processing method according to claim 8, further comprising:

transmitting, by the computer, the created word and/or the phrase with a communication module comprising a circuit to the electronic apparatus used by the target user.

10. The information processing method according to claim 7, wherein the learned model has learned search histories by users having an attribute for each of attributes of users, and the method further comprises:

creating a word and/or a phrase for learning by the target user on a basis of learning results of search histories of other users having the attribute equal to the attribute of the target user.

11. A non-transitory computer-readable recording medium storing a program to cause a computer of an information processing apparatus storing a learned model having learned correlation between character strings included in a search history of words and/or phrases to execute the learned model to receive information of a search history of words and/or phrases by a target user and create a word and/or a phrase for learning by the target user, wherein:

the learned model learns a time series of a plurality of character strings included in the search history, and the program further causes the computer to input search histories by the target user to the learned model in a time-series manner to output a word and/or a phrase that is not included in the input search histories in a time-series manner;

the learned model is a recurrent neural network (RNN) learning correlation between character strings of the time series included in the search history;

the learned model includes an input layer, an intermediate layer, and an output layer;

the input layer converts a character string input as the search history into a vector quantity, and outputs a character string vector acquired by conversion to the intermediate layer;

the intermediate layer is an RNN block which: receives the character string vector from the input layer and receives a previous output of the RNN block of a previous time, inputs the character string vector from the input layer and the previous output of the RNN block to a preset function f, and outputs output of the function f as a current RNN output of a current time, whereby the intermediate layer outputs an RNN output reflecting time-series input change;

the output layer converts the RNN output from the intermediate layer into a value of distribution of appearance probability of a character based on the input character string;

the program further causes the computer to create the word and/or phrase by combining characters based on the value of distribution of appearance probability of each character, determine whether the created word and/or phrase is included in dictionary content stored in the memory, and control an output device to output the created word and/or phrase determined to be included in the dictionary content stored in the memory, and execute creation of a word and/or phrase again if it is determined that the created word and/or phrase is not included in the dictionary content stored in the memory; and in executing learning, the program causes the computer to (a) input to the learned model a partial character string of the character string based on the search history, the partial character string including a predetermined amount of characters, and (b) input a next character in the character string as teacher data, and (c) the model predicts the appearance probability for each supposed character string, and (d) regulates a parameter for the function f in the RNN block to decrease a difference between the prediction result and the teacher data, wherein learning is performed by repeatedly executing (a)-(d), wherein, for each subsequent execution of (a)-(d), the program causes the computer to input, as the partial character string, a partial character string obtained by shifting a range of the character string by a predetermined number of characters to obtain a new partial character string overlapping in part with the previous partial character string.

12. The recording medium according to claim 11, wherein the learned model has learned correlation between character strings included in search histories of an electronic apparatus by a plurality of users including users other than the target user.

13. The recording medium according to claim 12, wherein the program further causes the computer to transmit the created word and/or the phrase with a communication module comprising a circuit to the electronic apparatus used by the target user.

14. The recording medium according to claim 11, wherein the learned model has learned search histories by users having an attribute for each of attributes of users, and the program further causes the computer to create a word and/or a phrase for learning by the target user on a basis of learning results of search histories of other users having the attribute equal to the attribute of the target user.

15. The information processing apparatus according to claim 1, wherein the at least one processor:

determines whether or not the created word and/or phrase is a word and/or phrase for which the target user has searched in a past predetermined time period;

controls the output device so as to output the created word and/or phrase which has been determined to be included the dictionary content stored in the memory and for which the target user has not searched in the past predetermined time period; and creates a word and/or phrase again if the created word and/or phrase is not included in the dictionary content stored in the memory or is a word and/or phrase for which the target user has searched in the past predetermined time period.

16. The information processing method according to claim 7, further comprising:

determining whether or not the created word and/or phrase is a word and/or phrase for which the target user has searched in a past predetermined time period;

controlling the output device so as to output the created word and/or phrase which has been determined to be included the dictionary content stored in the memory and for which the target user has not searched in the past predetermined time period; and creating a word and/or phrase again if the created word and/or phrase is not included in the dictionary content stored in the memory or is a word and/or phrase for which the target user has searched in the past predetermined time period.

17. The recording medium according to claim 12, wherein the program further causes the computer to:

determine whether or not the created word and/or phrase is a word and/or phrase for which the target user has searched in a past predetermined time period;

control the output device so as to output the created word and/or phrase which has been determined to be included the dictionary content stored in the memory and for which the target user has not searched in the past predetermined time period; and create a word and/or phrase again if the created word and/or phrase is not included in the dictionary content stored in the memory or is a word and/or phrase for which the target user has searched in the past predetermined time period.

* * * * *

UNITED STATES PATENT AND TRADEMARK OFFICE
CERTIFICATE OF CORRECTION

PATENT NO. : 12,411,892 B2  
APPLICATION NO. : 17/880246  
DATED : September 9, 2025  
INVENTOR(S) : Yoichi Murayama Page 1 of 1

It is certified that error appears in the above-identified patent and that said Letters Patent is hereby corrected as shown below:

In the Claims

Column 16, Line 3, delete "the" and insert -- in the --.

Column 16, Line 19 (counted Line 18), delete "the" and insert -- in the --.

Column 16, Line 35 (counted Line 33), delete "the" and insert -- in the --.

Signed and Sealed this  
Twenty-eighth Day of October, 2025

John A. Squires  
*Director of the United States Patent and Trademark Office*